June 24, 1947.  W. S. HOOVER  2,422,966
PROPELLER CONTROL
Filed March 14, 1941  2 Sheets-Sheet 1

INVENTOR:
Walter Scott Hoover
BY Harris G. Luther
ATTORNEY.

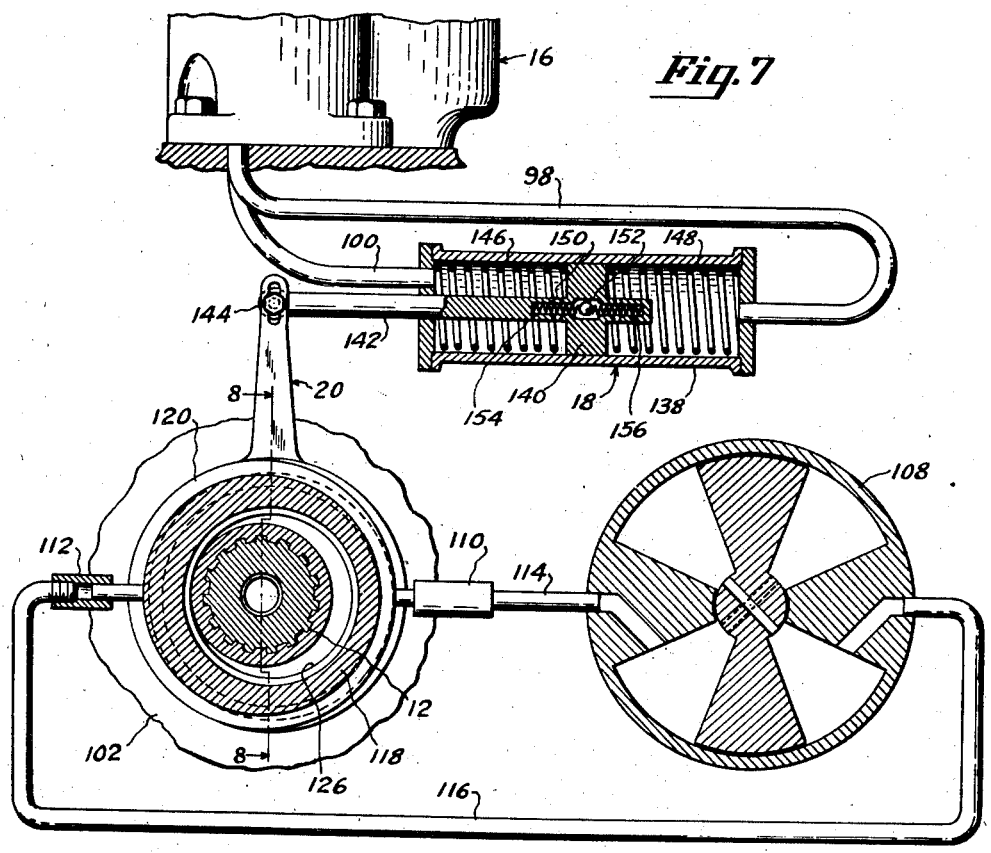
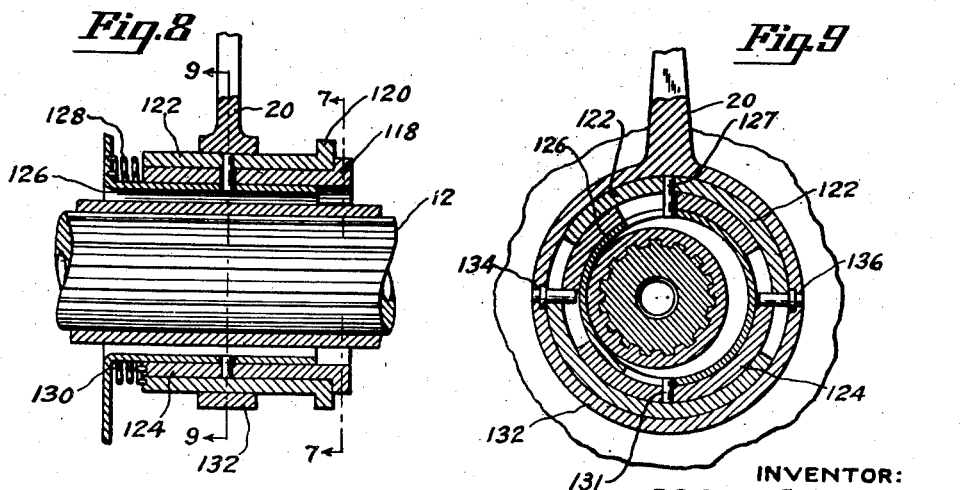

Patented June 24, 1947

2,422,966

UNITED STATES PATENT OFFICE 2,422,966

PROPELLER CONTROL

Walter Scott Hoover, Montreal, Quebec, Canada

Application March 14, 1941, Serial No. 383,392

5 Claims. (Cl. 170—163)

This invention relates to improvements in control devices for controllable-pitch constant-speed propellers and has particular reference to an improved control connection between such a propeller and a constant-speed hydraulic governor mounted on and driven by the propeller driving engine.

An object of the invention resides in the provision of an effective propeller control device of the character indicated which will transmit the speed correcting action of the relatively stationary governor to the rotating propeller.

A further object resides in the provision of an improved control apparatus of the character indicated which will cause the propeller pitch changing mechanism to follow closely the speed correcting action of the governor and will avoid hunting or overshooting of the propeller in response to the governor speed change requirement.

A still further object resides in the provision of an improved propeller control of the character indicated which utilizes entirely separate hydraulic systems for the governor and for the propeller pitch changing mechanism and avoids the necessity of providing an oil transfer bearing on the propeller shaft by utilizing a mechanical connection between the governor and the propeller.

Other objects and advantages will be more particularly pointed out hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are for the purpose of illustration only and are not to be taken as limiting or restricting the invention since it will be apparent to those skilled in the art that various changes in the illustrated embodiment may be resorted to without in any way exceeding the scope of the invention.

In the drawings,

Fig. 7 is a somewhat schematic view of the improved control mechanism, certain portions being shown in section to better illustrate the construction thereof.

Fig. 8 is a longitudinal sectional view on the line 8—8 of Fig. 7, and

Fig. 9 is a transverse sectional view on the line 9—9 of Fig. 8.

Figure 1:
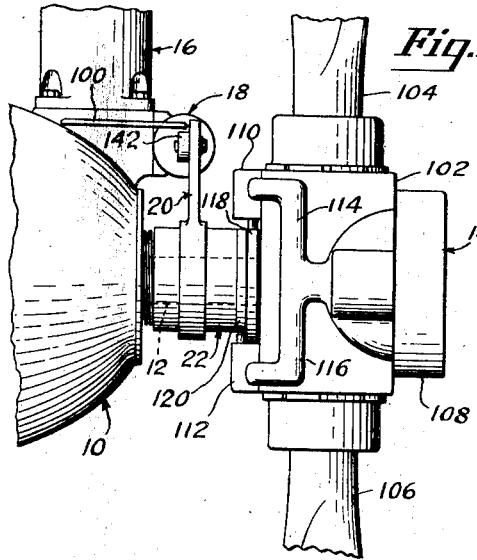
Fig. 1 is a somewhat schematic elevational view of a portion of an aircraft engine and governor and a portion of an aeronautical propeller showing the disposition of a control apparatus, constructed according to the invention, between the governor and the propeller.
Figure 2:
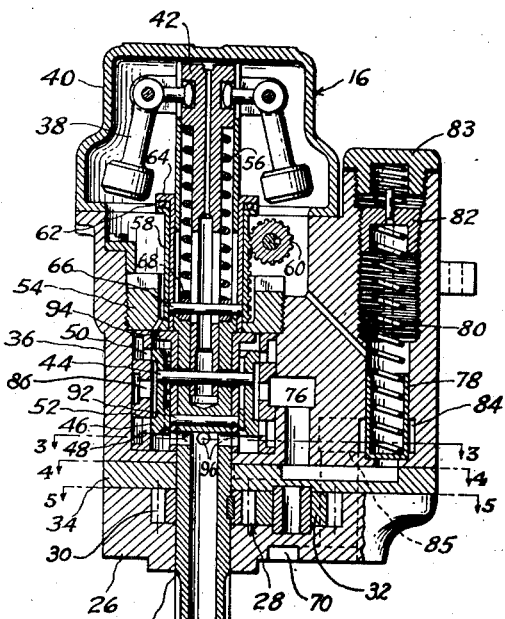
Fig. 2 is a longitudinal sectional view of a suitable form of speed responsive governor.
Figure 3:
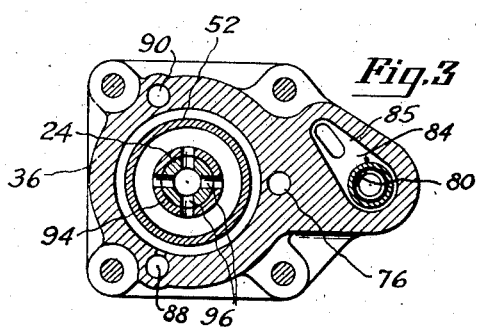
Fig. 3 is a transverse sectional view on the line 3—3 of Fig. 2.
Figure 4:
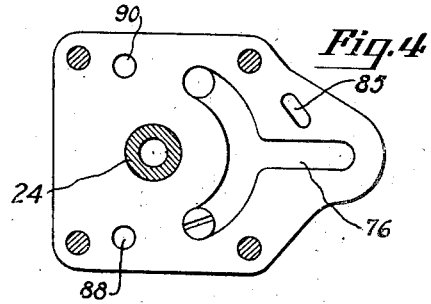
Fig. 4 is a transverse sectional view on the line 4—4 of Fig. 2.
Figure 5:
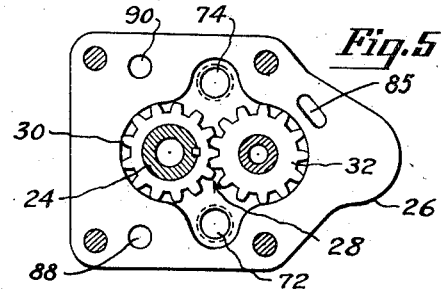
Fig. 5 is a transverse sectional view on the line 5—5 of Fig. 2.
Figure 6:
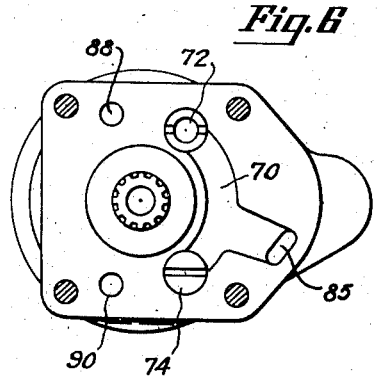
Fig. 6 is a bottom plan view of the governor illustrated in Fig. 2.

Referring to the drawings in detail, the numeral 10 generally indicates a power plant, such as an internal-combustion engine, from which projects a drive shaft 12 carrying a controllable-pitch aeronautical propeller, generally indicated at 14. While this propeller may be of any one of several forms well known to the prior art or may be a specially designed propeller, a propeller such as that illustrated in my prior United States Patent No. 2,023,785, issued December 10, 1935, for Hydraulic unit for variable pitch propellers, is particularly well adapted to the form of control apparatus constituting the subject matter of the invention. The engine supports and drives a suitable speed responsive governor, generally indicated at 16, which controls a hydraulic servo-motor, generally indicated at 18, connected with the control lever 20 of the propeller pump cam control 22.

A suitable form of governor for the purpose of disclosing the invention is particularly illustrated in Figs. 2, 3, 4, 5 and 6. In the governor illustrated, a drive shaft 24 projects through a base or pad 26 and through the portion of the engine upon which the pad 26 is secured to a driving connection with a movable part of the engine. Within the pad 26 there is a hydraulic pump, generally indicated at 28, comprising a gear member 30 mounted on the shaft 24 and a complementary gear member 32 mounted on an axle supported in the pad 26 and the cover plate 34 secured in position on top of the pad and through which the shaft 24 projects into the governor casing 36. At its outer end the shaft 24 carries a pair of flyballs 38 within a governor cap 40 which flyballs react against a plunger 42 disposed within the tubular upper portion of the shaft 24 and connected through a pin 44 with an annular slide valve 46 the flanged ends of which cooperate with annular ports 48 and 50 provided in a valve sleeve 52 mounted in a suitable chamber in the lower portion of the governor casing 36 and held in position therein by suitable means such as the abutment nut 54. A compression spring 56 urges the plunger 42 against the force exerted thereon by the action of centrifugal force on the flyballs 38 and the load on this spring can be adjusted by suitable means such as the rack and pinion members 58 and 60. The pinion 60 may be manually rotatable and the rack 58 may be connected through a rotatable connection 62, inner sleeve 64 and through pin 66 with the movable abutment 68 at the lower end of the spring. This arrangement provides suitable means for changing the speed setting of the governor either at the will of the operator or automatically in response to predetermined operating conditions of the vehicle, such as an airplane, upon which the governor is mounted.

The inlet of the pump 28 is through a channel 70 in the governor base 26 which channel is branched and provided with oppositely disposed ports 72 and 74 leading to the pump chamber. In operation one of these ports, for example the port 74, will be closed off by a suitable plug and the alternative port left open to accommodate the pump to either direction of rotation of the governor drive. The pump outlet which also includes two alternatively usable ports leads to a pressure chamber 76 connected with a pressure relief valve 78 comprising a piston reciprocably mounted in a bore in the governor casing and urged to closed position by a suitable compression spring 80 the load on which may be adjusted by suitable means such as the screw threaded abutment 82. The end of the bore may be closed by a suitable plug 83. From the relief valve chamber 84 a channel 85 leads back to the pump inlet so that pressure fluid vented by the relief valve may be recirculated through the pump in a manner well known to the art. The pressure chamber 76 is connected with an annular port 86 located intermediate the length of the valve sleeve 52 and separated from the ports 48 and 50 by annular shoulders on the valve sleeve so that there are three separate annular chambers around the valve sleeve connected with the ports 48, 50 and 86 respectively. The port 86 and the surrounding annular channel are connected only with the pressure chamber 76 while the port 48 and its surrounding annular chamber are connected with a fluid channel 88 and the port 50 and its surrounding annular channel are connected with a fluid channel 90. The spaces at the opposite ends of the valve piston 46 are connected together by means of suitable channels, as indicated at 92, leading through the space between the interior of the valve piston and a sleeve 94 mounted on the shaft 24 these spaces being connected with the interior of the engine through suitable apertures 96 leading to the interior of the hollow drive shaft 24 to provide a drain for the governor valve.

With this arrangement hydraulic fluid at a substantially constant pressure will be supplied to the intermediate portion of the governor actuated valve by the pump 28 and, when the valve piston 46 is in a lower position incident to an overspeed condition, the channel 88 will be connected with the pressure fluid through the port 48 and the channel 90 will be connected with drain through the port 50 and, conversely, when the valve piston is in an upper position incident to an underspeed condition, the channel 90 will be connected with the pressure fluid through the port 50 and the channel 88 will be connected with drain through the port 48. The lower ends of the channels 88 and 90 are brought to the exterior of the governor through suitable channels and fluid lines such as are schematically indicated at 98 and 100 in Fig. 7. The ports 48 and 50 and the end flanges of the valve piston 46 are so dimensioned that when the governor is in a neutral or "on-speed" condition both ports are blocked off entirely and fluid will not flow into or out of either of the lines 98 and 100.

This arrangement provides a governor having a source of hydraulic fluid and two outlet lines and a valve capable of connecting one outlet line with fluid under pressure and the other with drain and of reversing this connection in response to changes between overspeed and underspeed conditions of the governor driving engine, and of blocking off both lines when the engine is operating at an "on-speed" condition.

Any suitable type of propeller having a lever or mechanism that may be moved to change the propeller pitch may be utilized. For purposes of illustration the propeller disclosed in my United States Patent No. 2,023,785, has been selected. The propeller, as described in greater detail in my above-mentioned prior United States Patent No. 2,023,785, comprises a hub 102 which supports a plurality of blades, as indicated at 104 and 106 in Fig. 1, for pitch changing movements about their longitudinal axes. Within the hub there is a suitable fluid motor 108, which may be a vane type motor, as is particularly described and illustrated in my United States Patent No. 2,023,785, referred to above, and this motor may be connected to the propeller blades by suitable means such as bevel gears for rotating the blades in pitch changing directions upon movement of the movable portions of the vane motor. Two pump units, as indicated at 110 and 112, are carried by the propeller hub 102 and connected through separate channels, 114 and 116, with opposite sides of the vane motor in such a manner that when one of the pumps is operated the fluid pressure produced by said one pump will cause the vane motor to rotate in one direction and, when the other pump is operated, the vane motor will be rotated in the opposite direction. By this method of operating the pumps only one pump is operated at a time permitting the alternative pump to remain idle and allowing fluid from the side of the fluid motor connected with the idle pump to drain through a suitable means, to the intake of the operating pump. This method provides for a rapid and positive movement of the propeller blades in either pitch changing direction.

The pumps 110 and 112 rotate with the propeller 14 and are operated by respective adjustable cams 118 and 120. As is particularly shown in Figs. 7 and 8, the cams 118 and 120 are formed on the ends of respective cylindrical members 122 and 124 which are telescopically associated and rotatably mounted on a fixed bearing sleeve 126 which is eccentric of the axis of rotation of the shaft 12 by the same amount as the eccentricity of the respective cams 118 and 120 so that when the sleeves 122 and 124 occupy a predetermined angular position, hereinafter called a neutral position, relative to the fixed sleeve 126 the peripheries of the cams 118 and 120 will be concentric with the axis of rotation of the shaft 12 and the pumps 110 and 112 will move around the cams without being operated. The movable sleeves are resiliently urged to this neutral angular position by respective spiral spring members 128 and 130 which have one end fast in the member 126 and other end fast in the sleeves 122 and 124 respectively and arranged to move the sleeves around the sleeve 126 until the respective limit stop members 127 and 131 reach the ends of slots provided therefor in the fixed bearing sleeve 126 and thereby prevent movement of the sleeves away from their neutral position in predetermined directions. The control arm 20 has an annular portion 132 which surrounds the outer movable sleeve 122 and has lost motion connections in the form of the respective pins 134 and 136 with the sleeves 122 and 124. As is particularly shown in Fig. 9, if the arm 20 be given a right hand or clockwise movement the inner sleeve 124 will be rotated in the same direction away from its neutral position but the outer sleeve 122 will not be moved because of the space between the pins and the ends of the slots in the member 122 through which the pins project. However, if the arm be given a left hand or counterclockwise movement the sleeve 122 will be moved in the same direction away from its neutral position while the sleeve 124 will be left in its neutral position.

From this description it is apparent that the pitch of the propeller may be either increased or decreased by moving the arm 20 in the appropriate direction away from its neutral position thereby actuating the corresponding pump 110 or 112 to supply hydraulic fluid under pressure to the proper side of the hydraulic motor 108 to attain the pitch changing movement desired.

Movement of the control arm 20 is effected by the servo-motor 18 under the control of the governor 16. This servo-motor comprises a cylinder 138 to one end of which is connected the governor outlet line 98 and to the other end of which is connected the governor outlet line 100. Within the cylinder there is a piston 140 carried upon a piston rod 142 which projects from one end of the cylinder to a pivotal connection 144 with the free end of the control arm 20, this connection being provided with sufficient freedom lengthwise of the control arm to permit free angular movements of the arm upon reciprocation of the piston 140 in the cylinder 138. Compression springs 146 and 148 are disposed between the piston and the opposite ends of the cylinder to resiliently urge the piston to its central or neutral position, as illustrated, in which the control arm 20 is brought to its neutral position and the propeller is maintained against pitch change. A channel 150 leads through the piston and opens at opposite sides thereof and within this channel is a double acting ball check valve 152 urged to its central or neutral position, in which it does not close the passage, by balanced opposed compression springs 154 and 156. The springs 154 and 156 are sufficiently stiff so that the check valve 152 is not moved to valve closing position until one of the springs 146 or 148 has reached its solid or bottomed condition and the greater pressure difference between the two sides of the piston 140 causes an increased flow past ball 152 thus moving the ball 152 to valve closing position.

With this arrangement when the governor actuated valve, in response to a speed change requirement of the governor, admits fluid under pressure to one of the lines 98 or 100 and simultaneously connects the other line with drain, the pressure fluid will be admitted to the corresponding end of the cylinder 138 and will force the piston 140 away from this end of the cylinder. This movement of the piston will move the control arm 20 and actuate one of the pumps 110 or 112 to change the propeller pitch. As soon as the change in propeller pitch has created the required speed change the governor valve will be moved to its neutral or cut-off position blocking both the lines 98 and 100. The compressed one of the springs 146 or 148 will then act to move the piston 140 back to its neutral position, fluid from one end of the cylinder flowing to the opposite end through the channel 150 and the propeller pitch will then be maintained at the angle at which it regulated the engine speed to the governor requirement, since, with the piston 140 in its neutral position, both of the pitch changing pumps 110 and 112 will be rendered inoperative and flow of hydraulic fluid to and from the pitch changing motor will be blocked. Whenever the flow through the governor ports is reduced to a point where it is less than the flow through the channel 150 the piston 140 will tend to move to its neutral position. By properly dimensioning the governor valve ports and the channel 150 a return of the piston 140 to its neutral position can be initiated slightly before the governor valve cuts-off so that the return of the piston to its neutral position can be timed to exactly coincide with the attainment of the "on-speed" condition of the governor thereby avoiding over-shooting of the propeller pitch changing mechanism or hunting of this mechanism in the attempt to attain the speed required by the governor.

In some instances, as when an engine is first started, it may require a considerable time interval for the engine to come up to the speed for which the governor is set. In such a case the governor would operate the governor control valve in a manner to bring the propeller to its positive low pitch setting and retain it in that position until the engine speed approached that of the governor speed setting. In such a case if the channel 150 were left open there would be a considerable flow of oil through the servo-motor 18 during this time interval. With the inclusion of the check valve 152, however, as soon as the piston 140 has moved to its limiting position, continued flow of oil into the pressure side of the cylinder 138 will attempt to force an increased quantity of oil past the ball 152 and move the ball 152 to close off this channel and thereby prevent a further bleeding of pressure fluid from the pressure line leading from the governor to the drain line leading from the servo-motor back to the governor. This check valve will, therefore, prevent an excessive bleeding of engine lubricating fluid during the engine warm-up period and may be useful on other occasions to prevent a flow of hydraulic fluid from the governor source of fluid pressure back to drain. As soon as the engine has reached the speed required by the governor, the governor actuated valve will cut-off the supply of pressure fluid to the servo-motor and a very slight leakage of the pressure fluid either through this valve or past the piston or through the governor will relieve the pressure on the valve ball 152 caused by the trapped oil. As the action of the springs 146 or 148 on the trapped oil is not sufficient to hold the ball 152 on its seat a slight leak will reduce the pressure sufficiently to permit this ball to assume its neutral position whereupon the centering springs 146 and 148 will return the piston 140 to its neutral position with the result described above.

While a suitable mechanical embodiment has been hereinabove described and illustrated in the accompanying drawings for the purpose of disclosing the invention, it is to be understood that the invention is not limited to the particular embodiment so illustrated and described, but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. Mechanism for operatively connecting a speed-responsive governor mounted on a fixed support with a relatively rotatable controllable-pitch propeller comprising, a mechanical device for controlling pitch changing movements of said propeller and having one portion mounted on said support and having another portion carried by said propeller, and a servo-motor mounted on said support and actuated by fluid controlled by said governor and operatively connected with said one portion of said mechanical device, said servo-motor comprising a cylinder, a piston in said cylinder movable in opposite directions from a neutral position, means resiliently urging said piston toward said neutral position, and a restricted, normally open, fluid passage from one side of said piston to the other and means for closing said passage.

2. Mechanism for operatively connecting a speed-responsive governor mounted on a fixed support with a relatively rotatable controllable-pitch propeller comprising, a mechanical device for controlling pitch changing movements of said propeller and having one portion mounted on said support and having another portion carried by said propeller, and a servo-motor mounted on said support and actuated by fluid controlled by said governor and operatively connected with said one portion of said mechanical device, said servo-motor comprising a cylinder, a piston in said cylinder movable in opposite directions from a neutral position, means resiliently urging said piston toward said neutral position, and a restricted fluid passage from one side of said piston to the other and a check valve in said passage resiliently held in valve open position but movable to a closed position to prevent flow of oil above a predetermined rate from one side of said piston to the other.

3. Mechanism for operatively connecting a speed-responsive governor mounted on a fixed support with a relatively rotatable controllable-pitch propeller comprising, a mechanical device for controlling pitch changing movements of said propeller and having one portion mounted on said support and having another portion carried by said propeller, and a servo-motor mounted on said support and actuated by fluid controlled by said governor and operatively connected with said one portion of said mechanical device, said mechanical device comprising a pair of pumps mounted to rotate with the propeller, a pair of pump actuating cam members mounted on a fixed bearing eccentric to the axis of rotation of said propeller by an amount equal to the eccentricity of said cams, means comprising a single lever for selectively moving said cams one at a time away from a position of concentricity with said axis of rotation, means connecting said single lever with both of said cams, means connecting said single lever with said servo-motor and means resiliently urging both of said cams toward said position of concentricity.

4. In a propeller pitch control apparatus including a speed responsive governor mounted on a stationary support and a pitch changing mechanism having a stationary part and a part carried by said propeller cooperating with said stationary part and arranged so that said pitch changing mechanism is actuatable by propeller rotation, a connection between said governor and said pitch changing mechanism for controlling said pitch changing mechanism, said connection including a piston and cylinder construction connected with said stationary part for positioning said stationary part and controlling the actuation of said pitch changing mechanism and having a neutral position in which said pitch changing mechanism is maintained against substantial movement, resilient means continuously urging said connection toward said neutral position, said connection being moved away from said neutral position by operation of said governor, and means, including a by-pass from one side of the piston to the other and pressure actuated means controlling said by-pass, operable by pressure on one side of said piston to close said by-pass and operable upon a reduction in said pressure to open said by-pass to permit a return of said connection to said neutral position by said resilient means.

5. Mechanism for operatively connecting a speed-responsive governor mounted on a fixed support with a relatively rotatable controllable-pitch propeller comprising, a mechanical devive for controlling pitch changing movements of said propeller and having one portion mounted on said support and having another portion carried by said propeller, and a servo-motor mounted on said support and actuated by fluid controlled by said governor and operatively connected with said one portion of said mechanical device, said servo-motor comprising a chamber and a partition dividing said chamber and movable in opposite directions from a neutral position, means resiliently urging said partition toward said neutral position, and a restricted fluid passage from one side of said partition to the other and a check valve in said passage resiliently held in valve open position but movable to a closed position to prevent flow of fluid above a predetermined rate from one side of the partition to the other.

WALTER SCOTT HOOVER.

REFERENCES CITED

The following references are of record in the file of this patent:

UNITED STATES PATENTS

| Number | Name | Date |
| --- | --- | --- |
| 1,723,617 | Hele-Shaw et al. | Aug. 6, 1929 |
| 1,972,486 | Hoover | Sept. 4, 1934 |
| 2,023,785 | Hoover | Dec. 10, 1935 |
| 2,055,396 | Yoxall | Sept. 22, 1936 |
| 2,114,076 | Golz | Apr. 12, 1938 |
| 2,115,121 | Phillips | Apr. 26, 1938 |
| 2,129,828 | Dunn | Sept. 13, 1938 |
| 2,166,423 | Clark | July 18, 1939 |
| 2,248,789 | Setterblade | July 8, 1941 |
| 2,210,009 | Ruths et al. | Aug. 6, 1940 |
| 2,007,417 | Aivaz | July 9, 1935 |
| 2,229,058 | Dicks | Jan. 21, 1941 |
| 2,225,408 | Berliner | Dec. 17, 1940 |
| 2,284,154 | Lampton et al. | May 26, 1942 |
| 2,184,143 | Hoover | Dec. 19, 1939 |
| 1,959,889 | Wunsch | May 22, 1934 |
| 1,875,598 | Heath | Sept. 6, 1932 |
| 1,963,664 | Lambert | June 19, 1934 |

FOREIGN PATENTS

| Number | Country | Date |
| --- | --- | --- |
| 499,634 | Great Britain | Jan. 26, 1939 |
| 797,873 | France | Feb. 24, 1936 |
| 802,046 | France | May 30, 1936 |
| 134,258 | Great Britain | Oct. 30, 1919 |
| 434,567 | Great Britain | Sept. 4, 1935 |
| 635,992 | Germany | Sept. 30, 1936 |